United States Patent [19]
Fujita et al.

[11] Patent Number: 5,471,352
[45] Date of Patent: Nov. 28, 1995

[54] RECORDING/PLAYBACK APPARATUS IN WHICH HEAD AND TAPE ARE HELD IN INTERMITTENT CONTACT DURING RAPID SEARCH

[75] Inventors: Kouji Fujita, Yokohama; Shigemitsu Higuchi, Fujisawa, both of Japan

[73] Assignee: Hitachi, Ltd., Tokyo, Japan

[21] Appl. No.: 89,528

[22] Filed: Jul. 21, 1993

[30] Foreign Application Priority Data

Jul. 21, 1992 [JP] Japan ................................ 4-194201

[51] Int. Cl.⁶ .................................................. G11B 15/18
[52] U.S. Cl. .................. 360/72.2; 360/73.12; 360/77.06
[58] Field of Search .............................. 360/72.2, 77.12, 360/75, 77.13, 77.11, 78.08, 78.06, 77.06, 73.11, 73.12, 73.13

[56] References Cited

U.S. PATENT DOCUMENTS

| | | | |
|---|---|---|---|
| 4,805,050 | 2/1989 | Aoyagi et al. | 360/72.2 |
| 4,845,697 | 7/1989 | Giddings | 369/43 X |
| 4,845,697 | 7/1989 | Squires et al. | 360/75 X |
| 4,887,172 | 12/1989 | Steele | 360/72.2 X |
| 5,177,652 | 1/1993 | Yamaguchi et al. | 360/78.05 |
| 5,274,513 | 12/1993 | Nakano et al. | 360/72.2 |
| 5,311,380 | 5/1994 | Murata et al. | 360/77.12 |

FOREIGN PATENT DOCUMENTS

| | | |
|---|---|---|
| 60-115017 | 6/1985 | Japan . |
| 60-234278 | 11/1985 | Japan . |
| 64-57414 | 3/1989 | Japan . |
| 4-28048 | 1/1992 | Japan . |
| 4-42422 | 2/1992 | Japan . |

*Primary Examiner*—Aristotelis Psitos
*Assistant Examiner*—Varsha A. Kapadia
*Attorney, Agent, or Firm*—Antonelli, Terry, Stout & Kraus

[57] ABSTRACT

A recording/playback apparatus wherein rotary heads play back positional information recorded on a magnetic tape which can travel rapidly in a search operation. Piezoelectric actuators extend the rotary heads, an actuator driver drives the piezoelectric actuators, and a microprocessor controls the actuator driver. A target position on the magnetic tape is designated through a control panel by a user of the apparatus. The processor controls the actuator driver so as to hold the heads out of contact with the tape in a pause or stop mode of the apparatus, and so as to bring the heads into temporary contact with the tape at least once before the tape is caused to travel to the target position, whereupon the processor detects the positional information on the tape. When the target position has been approached, the processor controls the actuator driver so as to hold the heads in contact with the tape, and it detects the positional information. Thus, while providing a rapid search, the apparatus can prevent the heads and the tape from wearing away and can detect the target position precisely.

26 Claims, 9 Drawing Sheets

RECORDING/PLAYBACK APPARATUS IN WHICH HEAD AND TAPE ARE HELD IN INTERMITTENT CONTACT DURING RAPID SEARCH

BACKGROUND OF THE INVENTION

1. Field of the Invention

The present invention relates to a recording/playback apparatus, and more particularly to an apparatus wherein positions on a magnetic tape are intermittently accessed. Specifically, the invention concerns a high-density recording apparatus of helical scanning type such as a VTR (video tape recorder). Concretely, the invention is especially effective for an apparatus in which, as in the job of editing, the time period expended in causing a magnetic tape to travel to a position for recording or playback is often longer than the time period expended in actually recording or playing back data, and besides, the recording and playback need to be started precisely at desired positions on the magnetic tape while the random positions are iteratively accessed.

2. Description of the Related Art

In the conventional rapid search operation for moving a magnetic tape at high speed to a predetermined position at which recording/playback is to be started, in order to reduce the wear of the magnetic tape and the magnetic head, the tape is caused to travel fast under the condition that tape loading on a rotary cylinder is mechanically released completely or halfway so as to separate or space the tape away from the rotary cylinder. Rough locating is done by conjecturing a current search point in accordance with the ratio between the number of revolution pulses derived from respectively a takeup reel and a supply reel. When the vicinity of the desired position has been detected, the magnetic tape is wound round the rotary cylinder again. Since, however, such an operation requires a time period of several seconds, the long time period is wasted before the start of the recording/playback. Thus, in an editing job, usually the total time period expended in searching for desired positions on the tape accounts for the greater part of the overall handling time period of the VTR.

In this regard, a technique which performs the rapid search without releasing the tape loading is disclosed in the official gazette of Japanese Patent Application Laid-open No. 234278/1985. With this technique, in order to rapidly search for a designated address by utilizing address information recorded on a magnetic tape, an approximate position is detected by reel revolution detection means, and the detected position is corrected with the address information delivered from a magnetic head which is normally held in contact with the magnetic tape, thereby searching for the designated address. This technique, however, does not take it into consideration reducing the wear of the magnetic head and the magnetic tape.

Meanwhile, a technique for preventing the wear of a magnetic head and a magnetic tape is disclosed in the official gazette of Japanese Patent Application Laid-open No. 42422/1992. With the technique proposed here, whether or not the magnetic head is extended from a cylinder into contact with the magnetic tape is determined depending upon the operating modes of a recording/playback apparatus. By way of example, in the playback mode, the magnetic head is extended and is held in contact with the magnetic tape, whereas in the fast forward or rewind mode, the magnetic head is somewhat withdrawn and is not held in close contact with the magnetic tape. Such different degrees of the contact between the head and the tape are achieved by changing the magnitude of the extension of the head from the cylinder. Thus, a frictional force acting on the tape is alleviated in the fast forward or rewind mode, with the intention of protecting the tape and prolonging the service life of the head.

In addition, the official gazette of Japanese Patent Application Laid-open No. 115017/1985 discloses a technique which is intended to reduce the wear of a magnetic tape and a magnetic head similarly to the preceding technique. Herein, the magnetic head and the magnetic tape are held out of contact in an ordinary fast forward or rewind mode. On the other hand, when a predetermined switch is pressed in the fast forward or rewind mode, the magnetic head is extended, and a picture is played back while the magnetic tape is being fast forwarded or being rewound.

Besides, the official gazette of Japanese Patent Application Laid-open No. 57414/1989 discloses a technique which is intended to reduce the wear of a magnetic head and a magnetic tape in a full loading type VTR wherein the magnetic tape and the magnetic head are held in contact even when no picture is recorded or played back as in a fast forward or rewind mode. With this technique, in the fast forward or rewind mode, the magnetic head is withdrawn so as to come out of contact with the magnetic head.

Further, the official gazette of Japanese Patent Application Laid-open No. 28048/1992 discloses a technique which concerns a case where pictures are recorded or played back at different magnetic tape speeds. With this technique, in order to prevent the state of contact between a magnetic tape and a magnetic head from changing in dependency on the magnetic tape speeds, a plurality of modes which are determined by the speeds of the magnetic tape are set beforehand, and the magnitude of extension of the magnetic head is varied in accordance with the modes.

Any of the prior-art techniques for reducing the wear consists in determining whether the magnetic head is extended, in accordance with the operating mode for the purpose of alleviating the frictional force of the head on the magnetic tape. None of these prior-art techniques takes into consideration to precisely detect the start position of the recording or playback in the rapid search for the desired position.

At present, it is required of the helical scanning type apparatus such as a VTR to find out the desired position quickly and precisely without damaging the magnetic tape, in the rapid search.

SUMMARY OF THE INVENTION

An object of the present invention is to provide a recording/playback apparatus which can reduce the wear of a magnetic head and a magnetic tape while searching for a designated position precisely and rapidly.

In order to accomplish the object, according to the present invention, a playback apparatus which has a playback head and in which a magnetic signal expressive of positional information recorded on a magnetic tape beforehand is played back, comprises a first actuator which supports the playback head in a manner to freely bring it into and out of contact with the magnetic tape; first drive means for driving the first actuator; tape traveling means for causing the magnetic tape to travel; acceptance means for accepting target position information indicative of a target position to-be-played-back on the magnetic tape; a controller which sends the first drive means a command for bringing the playback head into temporary contact with the magnetic tape at least once during the traveling of the magnetic tape; and generation means for generating positional information indicative of a position of the playback head on the magnetic tape in accordance with the played-back signal sent from the playback head; the controller detecting whether the target position has been reached on the basis of the generated positional information.

Owing to the construction stated above, unlike the prior-art techniques, the present invention acquires the positional information indicative of the position of the playback head in such a way that the playback head is intermittently brought into contact with the magnetic tape, without holding the playback head in contact with the magnetic tape normally even in one operating mode. Therefore, the wear of the magnetic head and the magnetic tape can be reduced compared with that in the prior art. Moreover, the predetermined position can be precisely detected since the positional information is acquired by the playback head.

BRIEF DESCRIPTION OF THE DRAWINGS

FIG. 2(a) is an explanatory view showing the state in which a rotary head is out of contact with a magnetic tape, while

FIG. 3(a) is an explanatory view showing the state in which a fixed head is in contact with a magnetic tape, while

PREFERRED EMBODIMENTS OF THE INVENTION

Now, embodiments will be described.

Figure 1:
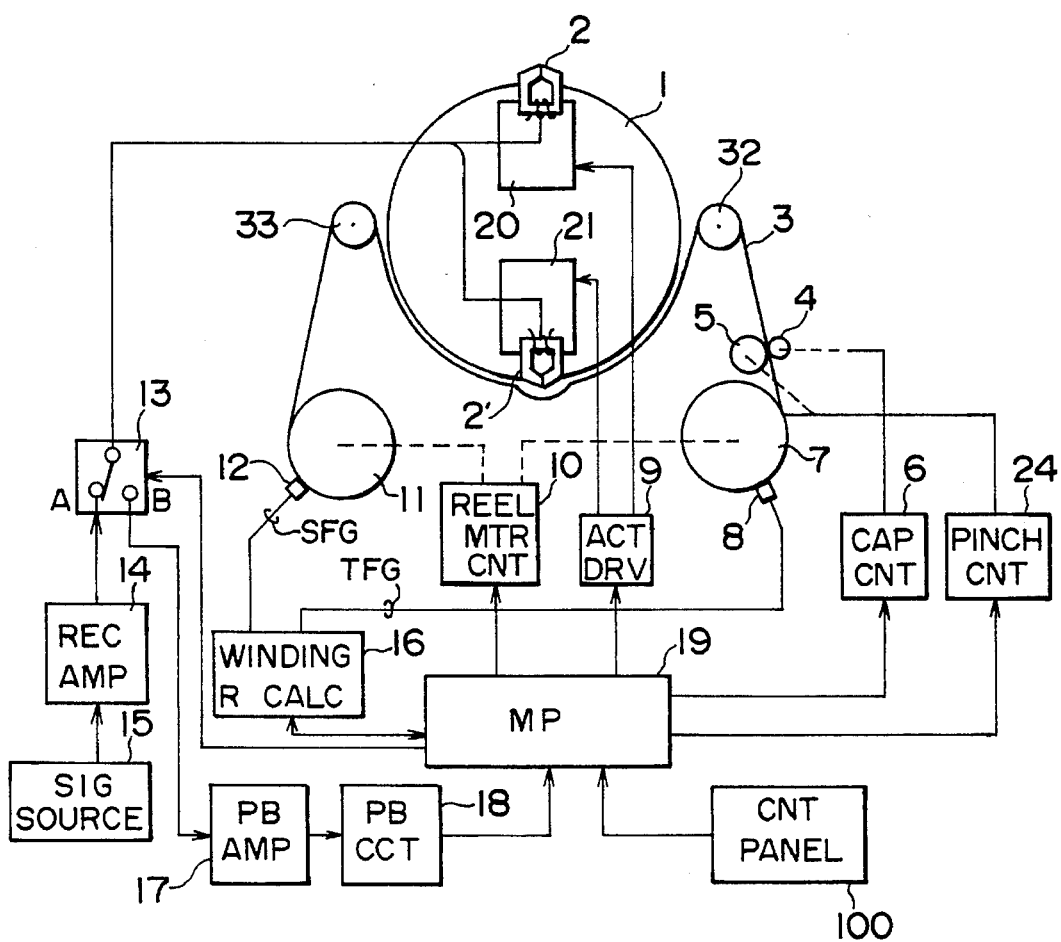
FIG. 1 is a block diagram showing an embodiment of a recording/playback apparatus according to the present invention.

FIG. 1 illustrates one embodiment of the present invention.

Referring to FIG. 1, a recording/playback apparatus in this embodiment includes a rotary cylinder (rotary drum) 1, and recording/playback heads 2 and 2'. Also included for moving a magnetic tape 3 are a capstan 4, a pinch roller 5, a takeup reel 7, a supply reel 11, and tape guides 32 and 33.

The capstan 4 is controlled by a capstan driver or controller 6, while the pinch roller 7 is controlled by a pinch roller driver or controller 24. Revolution detectors 8 and 12 are provided in correspondence with the takeup reel 7 and the supply reel 11, respectively. These reels 7 and 11 are controlled by a driver 10 which is a reel motor control circuit. This embodiment also includes a switching circuit 13, a recording amplifier 14, and a signal source 15 by which time codes being positional information are generated and delivered in the recording operation of the apparatus. It further includes a reel winding radius calculator 16, a playback amplifier 17, and a playback circuit 18 by which time codes are generated from signals read by the playback heads 2 and 2' in, e.g., the rapid search operation. A control panel 100 as acceptance means accepts a time code indicative of that target position on the magnetic tape 3 which is to be played back. A microprocessor 19 detects if the target position delivered from the acceptance means 100 has been reached, on the basis of the time codes read from the magnetic tape 3. Piezoelectric elements 20 and 21 being actuators have the respective rotary heads 2 and 2' mounted thereon, and they are driven by an actuator driver 9.

The magnetic tape 3 is caused to travel by the takeup reel 7, reel driver 10, supply reel 11 and microprocessor 19.

Figure 9:
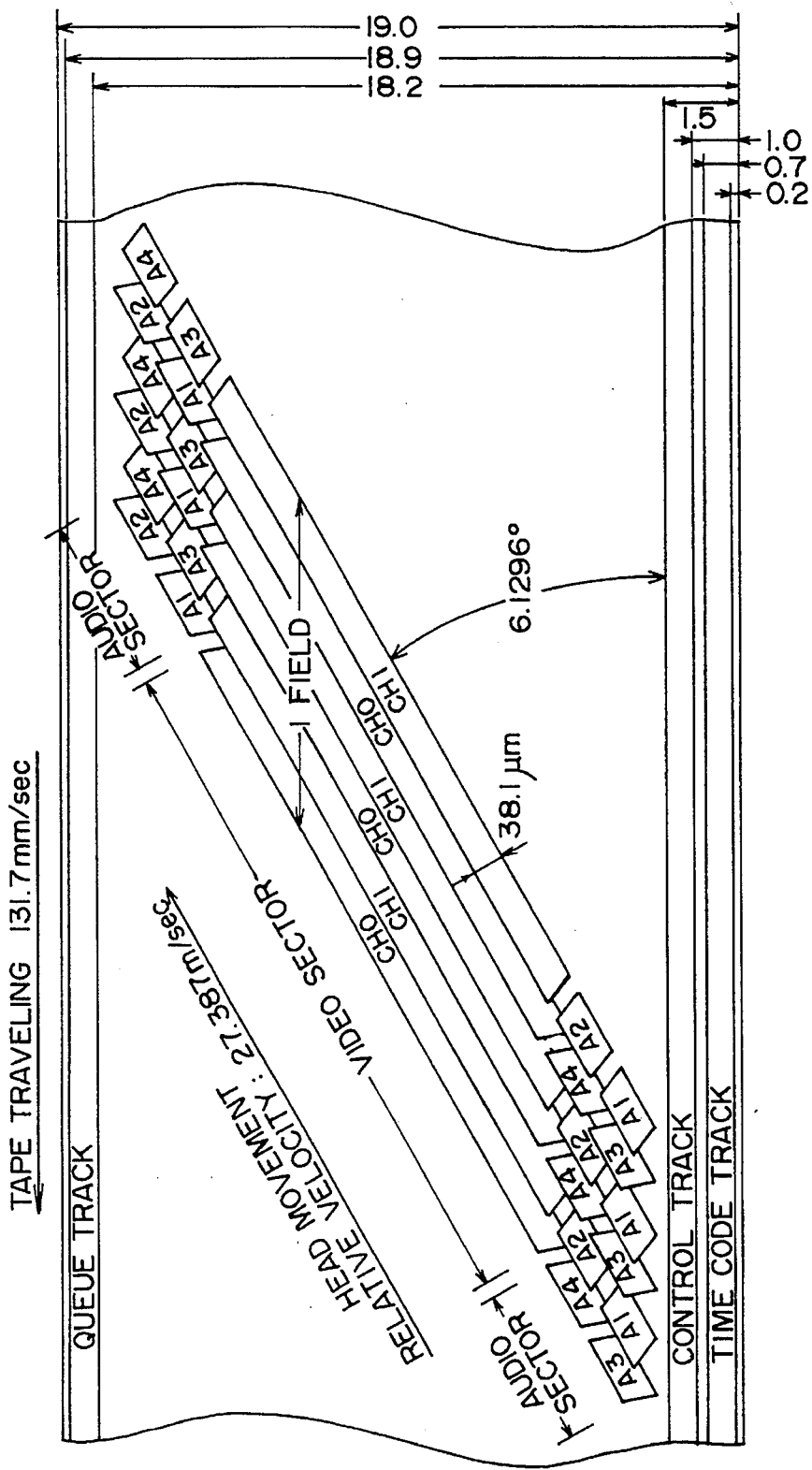
FIG. 9 is an explanatory view showing the recording format of time codes.

A command which is given by the user of the recording/playback apparatus is input in the form of spacial information (temporal information) called a "time code". The time codes have already been recorded on the tape 3, and each of them is composed of hours, minutes, seconds, and the number of frames. The initial position of the tape 3 is set at 0 [second]. The user designates the time and the frame No. at which he/she wants to start the recording or playback, among the recorded time codes. Such time codes are of two sorts; ① time codes which are recorded on helical tracks (the time codes of this sort are recorded at the same time that data are actually recorded on the helical tracks), and ② time codes which are recorded in the longitudinal direction of a magnetic tape (the time codes of this sort are recorded before the forwarding of the tape, or at the same time that data are actually recorded on helical tracks). This embodiment corresponds to the sort ①. A recording format which includes the format of the time codes is illustrated in FIG. 9. In the case of the sort ①, the time code is recorded at the head part of a video sector (CH0, CH1) shown in FIG. 9. Even in a case where the recording has been temporarily interrupted, the time codes are recorded in terms of successive numerical values. On the other hand, in the case of the sort ②, the time codes are recorded on a time code track shown in FIG. 9.

The revolution detectors 8 and 12, and the reel winding radius calculator 16 find the approximate position of the magnetic tape 3. More specifically, the revolution detectors 8 and 12 are pulse generators for generating a number of pulses proportional to the revolving angular velocities of the respective reels 7 and 11. The microprocessor 19 determines the current time in such a way that the lapse of a time period is evaluated from the change of the residual quantity of the tape 3. Concretely, the radii of the tape windings of the reels 7 and 11 are evaluated from the ratio between the output signal SFG (SUPPLY FREQUENCY GENERATOR signal) of the revolution detector 12 for detecting the revolving frequency of the supply reel 11 and the output signal TFG (TAKEUP FREQUENCY GENERATOR signal) of the revolution detector 8 for detecting the revolving frequency of the takeup reel 7. Thereafter, the residual quantity of the tape 3 is detected from the evaluated radii. Further, the detected residual quantity is converted into the time period. Such a locating operation will be explained with reference to FIG. 10.

Figure 10:
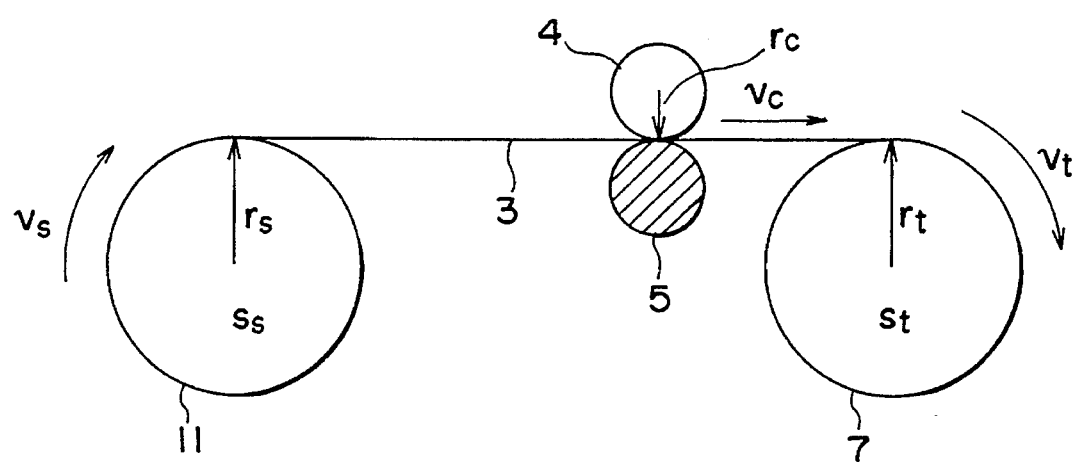
FIG. 10 is an explanatory view showing a method of measuring a time period by means of a calculator for the winding radius of a reel.

The winding radii $r_s$ and $r_t$ of the respective reels 11 and 7 are calculated as stated below. In FIG. 10, numerals 11, 7, 4, 5 and 3 designate the same parts as in FIG. 1, respectively. Letting $S_s$ denote the area of the tape winding on the supply reel (abbreviated to "S reel") 11 (the area of the circle of the tape winding on the reel as viewed from above), and letting $S_t$ denote the area of the tape winding on the takeup reel (abbreviated to "T reel") 7, the area $S_o$ of the total winding of the magnetic tape 3 is expressed by Eqs. (1) and (2):

$$S_t + S_s = S_o \qquad (1)$$

$$S_o = \pi r_s^2 + \pi r_t^2 \qquad (2)$$

Here, the area $S_o$ is a constant value. Further, the tape takeup velocity $v_t$ of the T reel 7, the tape supply velocity $v_s$ of the S reel 11, and the velocity $v_c$ of the capstan 4 having a radius $r_c$ are respectively expressed by Eqs. (3), (4) and (5):

$$v_t = \omega_t \, r_t = 2\pi f_t \cdot r_t \qquad (3)$$

$$v_s = \omega_s \, r_s = 2\pi f_s \cdot r_s \qquad (4)$$

$$v_c = \omega_c \, r_c = 2\pi f_c \cdot r_c \qquad (5)$$

Here, symbols $\omega_t$, $\omega_s$ and $\omega_c$ denote the revolving angular velocities of the T reel 7, the S reel 11 and the capstan 4, and symbols $f_t$, $f_s$ and $f_c$ the revolving frequencies thereof, respectively. The revolving frequencies $f_t$ and $f_s$ are respectively detected by the revolution detectors 8 and 12. The velocities $v_t$, $v_s$ and $v_c$ relate to the traveling velocity $v_o$ of the tape 3 as follows:

$$v_o = v_t = v_s = v_c \qquad (6)$$

Owing to this relationship, the following Eqs. (7) and (8) are obtained from the above Eqs. (3), (4) and (5):

$$r_s = \frac{f_c}{f_s} \cdot r_c \qquad (7)$$

$$r_t = \frac{f_c}{f_t} \cdot r_c \qquad (8)$$

The winding radii $r_s$ and $r_t$ of the S and T reels 11 and 7 in the case of causing the tape 3 to travel by the use of the capstan 4 are respectively calculated as thus far stated. On a other hand, in the rapid search, the tape 3 is moved at a velocity which is 100 times higher than the traveling velocity in the ordinary recording or playback operation, by only the reels 7 and 11 without using the capstan 4. Accordingly, before the operation of the recording/playback apparatus is shifted to the rapid search, the tape winding radii $r_s$ and $r_t$ are respectively evaluated by Eqs. (7) and (8), and the area $S_o$ of the total tape winding is subsequently calculated by Eq. (2). After the calculation of the area $S_o$, the capstan 4 is disengaged from the pinch roller 5, and the tape 3 is moved by only the reels 7 and 11. On this occasion, the following Eq. (9) is derived from the above Eqs. (2), (7) and (8):

$$S_o = \pi \, r_s^2 + \pi \left( \frac{f_s}{f_t} \cdot f_s \right)^2 \qquad (9)$$

This equation is reduced with respect to the winding radius $r_s$ as follows:

$$r_s = \sqrt{\frac{S_o}{\pi \left( 1 + \left( \frac{f_s}{f_t} \right)^2 \right)}} \qquad (10)$$

Eq. (10) indicates that the winding radius $r_s$ is evaluated from the information $f_s$ and $f_t$ detected by the respective revolution detectors 12 and 8. Letting $r_{s1}$ denote the winding radius of the S reel 11 at a certain time, $r_s$ denote the winding radius of the S reel 11 at the lapse of a time period T, and $T_a$ denote the decrement of the area of the tape winding on the S reel 11 (equal to the area of that part of the tape 3 which has traveled), the following Eq. (11) holds:

$$T_a = \pi r_{s1}^2 - \pi r_s^2 \qquad (11)$$

Letting t denote the thickness of the tape 3, and L denote the length of the tape part having traveled in the meantime, the following Eq. (12) holds:

$$L = Ta/t \qquad (12)$$

When the length L is multiplied by a predetermined coefficient K, the elapsed time T is found as follows:

$$T = K \cdot L \qquad (13)$$

Next, the operation of this embodiment will be described.

The "pressed" contact state between the magnetic tape 3 and each of the rotary heads 2 and 2' in this embodiment will be explained with reference to FIGS. 2(a) and 2(b).

Figure 2A:
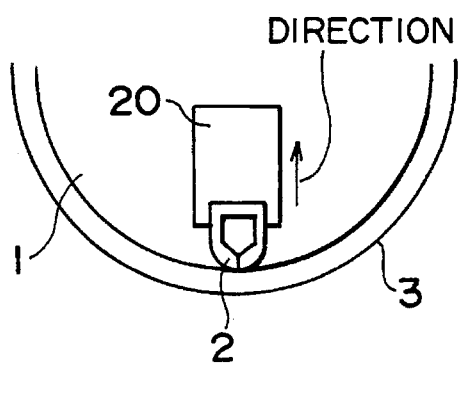

FIG. 2(a) illustrates the state of noncontact between the magnetic tape 3 and the rotary head 2 (or 2'). In this state, a voltage is applied to the piezoelectric transducer 20 (or 21) so as to elongate this transducer inward of the rotary cylinder 1. On the other hand, FIG. 2(b) illustrates the state of contact, in which a voltage is applied to the piezoelectric transducer 20 (or 21) so as to elongate this transducer outward of the rotary cylinder 1.

Here a series of operations will be explained in the case where the user records information on the specified track of the magnetic tape 3.

When the command of recording and the time code indicative of a start position are input to the microprocessor 19 through the acceptance means 100 by the user, the microprocessor 19 tries to grasp the current position of the tape 3. In a case where the current position is not known because of, e.g., the initial state of the recording/playback apparatus, the apparatus is shifted once into the playback state. Then, the current position of the tape 3 is grasped by reading out the time code recorded on the sync signal part of the oblique track of the tape 3. Even in a case where the current position is known, the playback mode is established when the current position differs from the target position. Incidentally, on this occasion, in a case where the current mode of the apparatus is neither the recording mode nor the playback mode (that is, the current mode is "pause", "stop" or the like) and where it is shifted into the recording mode by the above command, the rotary heads 2 and 2' lie in the separated or withdrawn states shown in FIG. 2(a) because they need not be held in contact with the magnetic tape 3 in the pause mode, the stop mode or the like. Therefore, the rotary heads 2 and 2' are actuated once by the respective transducers 20 and 21 so as to extend the rotary cylinder 1 outward and to come into contact with the magnetic tape 3.

Figure 2B:
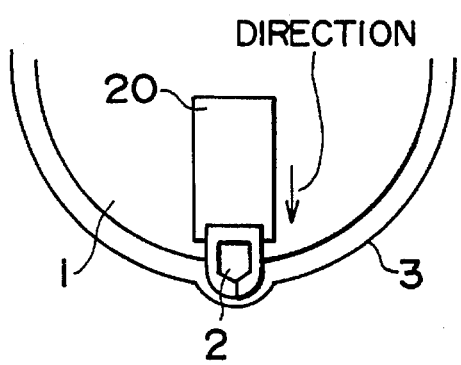
FIG. 2(b) is an explanatory view showing the state in which the rotary head is in contact with the magnetic tape.

When the playback mode has been established, the reed of the switching circuit 13 is thrown to the side of a terminal B, the pinch roller driver 24 brings the pinch roller 5 into tight engagement with the capstan 4, and the piezoelectric transducer driver 9 drives the transducers 20 and 21 to bring the respective rotary heads 2 and 2' into contact with the magnetic tape 3 as shown in FIG. 2(b).

In the playback state, the magnetic tape 3 travels at the same velocity as in the recording state, and signals recorded on the magnetic tape 3 are played back by the rotary heads 2 and 2'.

Herein, since the common contact of the switching circuit 13 is connected with the terminal B, the signals are amplified by the playback amplifier 17. Thereafter, the time code signal is converted by the playback circuit 18 into a signal which the microprocessor 19 can recognize. When the time code signal has been played back, the rotary heads 2 and 2' are withdrawn into or accommodated inside the rotary cylinder 1, thereby coming out of contact with the magnetic tape 3 again. However, when the current position is very close to the target position, the rotary heads 2 and 2' are held in contact with the magnetic tape 3 without being brought out of contact. The microprocessor 19 computes the distance (time difference) between the tape position which is being currently played back and the tape position at which the playback or recording is to be started.

In a case where the distance from the current position to the desired position of the magnetic tape 3 is long, the operation of the recording/playback apparatus is shifted to the rapid search mode so as to move the tape 3 at high speed. Further, since the capstan 4 cannot follow up the high revolving speed of the rapid search, the tight engagement of the pinch roller 5 with the capstan 4 is released.

During the rapid search, the rotary heads 2 and 2' are out of contact with the magnetic tape 3, and hence, the time codes borne on the tape 3 cannot be read. Therefore, the approximate tape traveling position is calculated in the way that the residual quantity of the tape 3 is detected by the reel winding radius calculator 16 on the basis of the signal (SFG signal) delivered from the revolution detector 12 corresponding to the supply reel 11 and the signal (TFG signal) delivered from the revolution detector 8 corresponding to the takeup reel 7. However, the exact tape position cannot be known from only the information generated by the reel winding radius calculator 16.

In this regard, the present invention is so contrived that the rotary head 2 or 2' is extended from the rotary cylinder 1 in single-shot fashion every predetermined cycle, whereupon the time code borne on the tape 3 is read. The detected result of the residual tape quantity is corrected every read time code, and the correction is made by replacing the calculated tape position with the read time code. Thus, the accuracy of the tape positions sequentially computed from the tape winding radii is enhanced.

When the vicinity of the desired tape position has been reached in due course, the pinch roller 5 is brought into tight engagement with the capstan 4, and the rotary heads 2 and 2' are extended or protruded outward of the rotary cylinder 1 into contact with the magnetic tape 3. These controls are performed by the microprocessor 19. Herein, the time code signal is generated by the playback amplifier 17 as well as the playback circuit 18 again, and the time codes are recognized by the microprocessor 19, whereby the position for starting the recording or playback is computed at high accuracy. It turns out that the precise track as desired can be finally recorded or played back. It is a matter of course that, on this occasion, the contact of the switching circuit 13 is thrown to the side of a terminal A or the terminal B in conformity with the recording or playback mode.

The above operations will be explained more with reference to the operating sequence diagram of FIG. 4 and the flow chart of FIG. 5.

The ensuing explanation will be centered on the magnitudes or displacements of the extension of each of the rotary heads 2 and 2' and the cycles of the displacements thereof during the rapid search. It is assumed as an operating condition that data are to be recorded from a tape position which is far distant from the current tape position (for example, which is one hour later).

Figure 4:
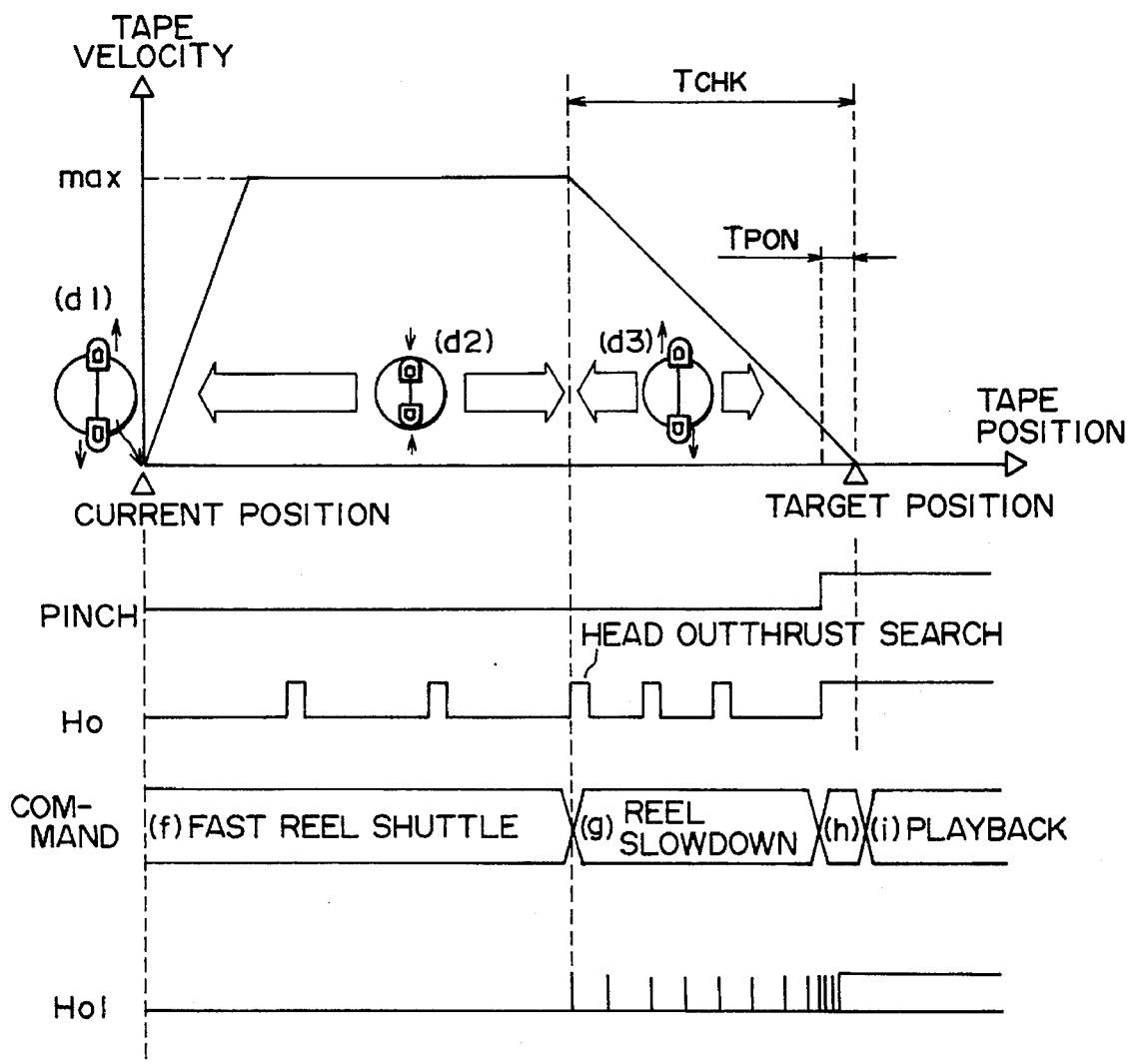
FIG. 4 is an explanatory diagram showing the states of an extension control for the rotary head during the rapid search operation in the present invention.

FIG. 4 represents the tape position on the axis of abscissas, and the tape velocity on the axis of ordinates. Further, it illustrates signal waveforms. A "Pinch" signal controls the pinch roller 5 in such a manner that the high level thereof holds the pinch roller in tight engagement with the capstan 4, whereas the low level thereof releases the engagement of the pinch roller. An "Ho" signal controls the extensions of the rotary heads 2 and 2' in such a manner that the high level thereof extends or protrudes the rotary heads from the rotary cylinder 1, whereas the low level thereof withdraws or accommodates the rotary heads within the rotary cylinder 1. That is, the "Ho" signal is a timing signal for extending the heads 2 and 2'. In the illustration, the "Ho" signal corresponds to a case where the playback heads 2 and 2' are extended at regular time intervals determined for each section of the tape 3. The user's command specifies a fast tape traveling section (in the course of the search) (f), a tape traveling slowdown section (g), a section (h) for the search at a velocity which is not higher than 4 times as high as the ordinary playback velocity, and a section (i) for the ordinary playback or recording. In the section (f), the target position is searched for at a velocity which is 60 times ~100 times as high as the ordinary playback velocity. In the section (h), the target position is searched for at a velocity which is, for example, not higher than 4 times as high as the ordinary playback velocity (the search velocity is not higher than a velocity at which the tape traveling can be stopped immediately by braking).

In the section (f), the current position is detected as the approximate tape position which is delivered from the reel winding radius calculator 16. In contrast, in each of the sections (g), (h) and (i), the current position is detected as the time code which is played back from the magnetic tape 3.

It is here assumed that the current operating mode of the apparatus is pause or stop, and that the rotary cylinder 1 is kept rotating. On this occasion, the same signal is iteratively played back from the tape 3. In such a case, the same track need not be played back iteratively, but the pertinent track may be read only once. That is, the iterative playback merely wears the rotary heads 2 and 2' wastefully.

In this embodiment, in the above case, the rotary heads 2 and 2' are withdrawn into or accommodated inside the rotary cylinder 1 and are held out of contact with the magnetic tape 3.

In the above case, the current tape position has been grasped by playing back the time code borne on the tape 3. It is sometimes impossible, however, to grasp the precise tape position in, for example, the case where the apparatus is in the initial state.

Figure 5:
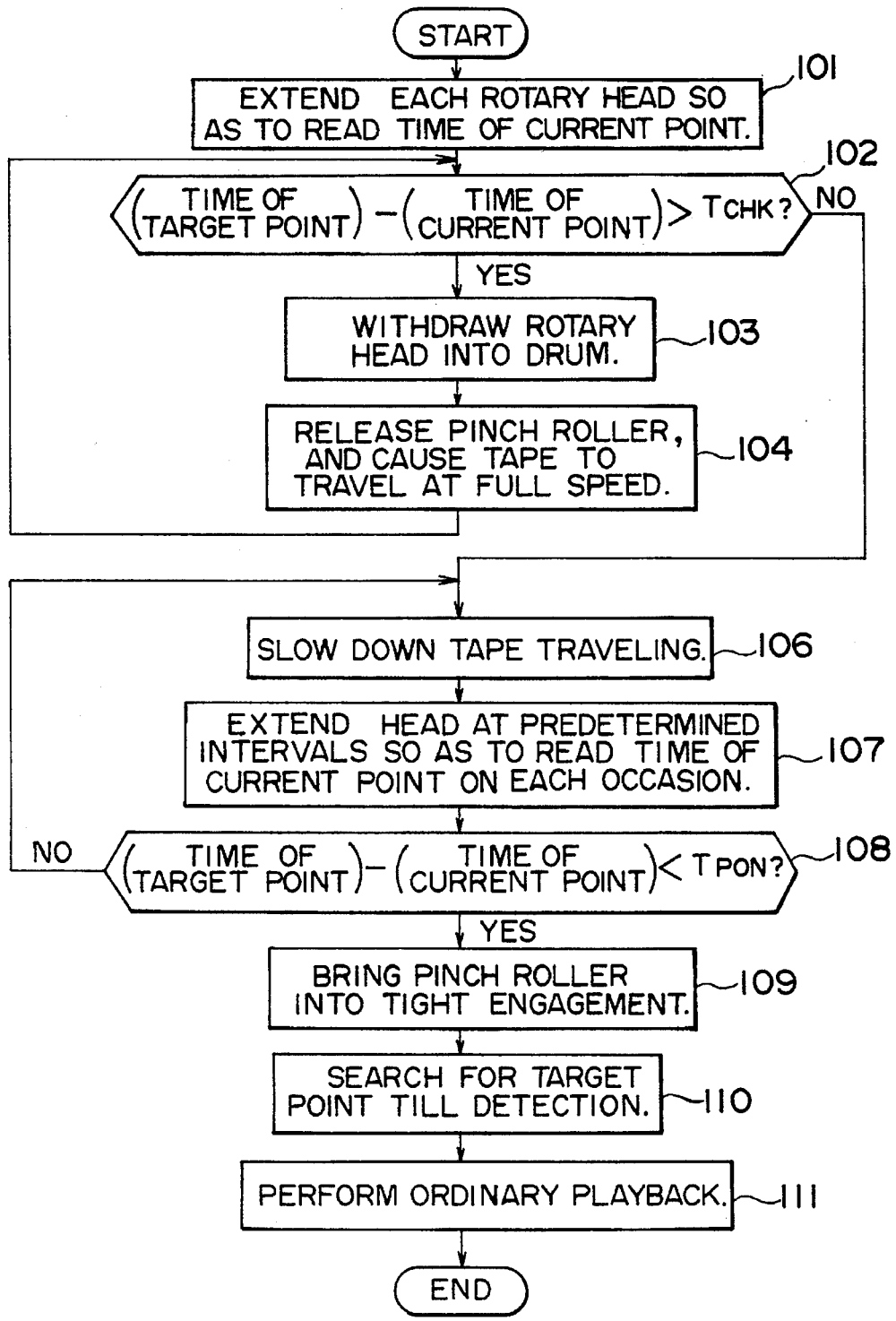
FIG. 5 is a flow chart showing a processing sequence during the rapid search operation in the present invention.

In this embodiment, therefore, each of the rotary heads 2 and 2' is always extended once from the rotary cylinder 1 as shown at (d1) in FIG. 4 before the shift into the rapid search state, so as to read the time code borne on the magnetic tape 3 (step 101 in FIG. 5).

Subsequently, the difference between the target position and the current position is calculated (step 102). In a case where the difference is greater than a predetermined time period $T_{CHK}$, each of the rotary heads 2 and 2' is withdrawn into the rotary cylinder 1 (as shown at (d2) in FIG. 4) so as to come out of contact with the magnetic tape 3 (step 103).

Subsequently, the pinch roller control signal (Pinch) is turned OFF (or is set at its low level) to disengage the pinch roller 5 from the capstan 4, whereby the tape 3 is caused to travel at high speed (step 104).

As stated before, while the tape 3 is traveling fast, the time code signal is not played back from the tape 3, and hence, only the approximate tape position is found by processing the signals delivered from the supply reel revolution detector 12 and the takeup reel revolution detector 8. During the rapid search, therefore, each of the rotary heads 2 and 2' is extended (as shown at (d1) in FIG. 4) from the rotary cylinder 1 in one-shot fashion every predetermined cycle, whereby the time code borne on the tape 3 is read. Thereafter, each of the rotary heads 2 and 2' is accommodated within the rotary cylinder (as shown at (d2) in FIG. 4) again.

The information of the approximate tape position delivered from the reel winding radius calculator 16 is corrected (or replaced) with the read time code by the microprocessor 19.

Since the recording is to be started at the distant position in the case of FIG. 4, the difference between the target position and the current position is determined to be smaller than the predetermined value $T_{CHK}$ at the step 102 after the steps 102~104 have been iterated several times. Then, the routine proceeds to a step 106. Such a situation will be explained below. The traveling of the tape 3 is slowed down (step 106) when the difference time period between the target position and the current position is shorter than the predetermined time period $T_{CHK}$ (step 102), that is, the position of the tape 3 has come into the vicinity of the target position.

Even in the tape slowdown region (g), each of the rotary heads 2 and 2' is similarly extended from the rotary cylinder 1 in one-shot fashion so as to read the time code. In this region, however, each head is controlled so that the time code borne on the tape 3 may be read at a cycle shorter than the read cycle in the rapid search (step 107). In this manner, as the current position comes near to the target position, the number of times of reading the time codes is increased. Accordingly, the tape traveling can be prevented from overrunning the target value.

Thereafter, when the difference time period between the target position and the current position has become less than a predetermined time period $T_{PON}$ (step 108), that is, when the tape position is just before the target position, the pinch roller 5 is brought into tight engagement with the capstan 4 (step 109). Besides, the rotary heads 2 and 2' are extended from the cylinder 1 so as to search for the target position at the ordinary playback velocity (step 110). When the target position has been detected, the operation of the recording/ playback apparatus is shifted to the ordinary playback or recording operation as intended originally (step 111). When the difference time period between the target position and the current position is not less than the predetermined time period $T_{PON}$ at the step 108, the steps 106~108 are iterated.

The extension cycle of each of the rotary heads 2 and 2' in the tape traveling slowdown region ($T_{CHK}$ section) shown in FIG. 4 may well be shortened as the target position comes nearer, thereby enlarging the number of times that each head makes contact with the tape 3 nearer the target position. This expedient is achieved by an "Ho1" signal which is a timing signal for extending each head as illustrated in FIG. 4. Whereas the "Ho" signal stated before functions Go extend each playback head every regular time period, the "Ho1" signal functions to shorten the timing cycle for extending each playback head, as the tape position approaches the desired position. In the section (f), the current position of the tape 3 is obtained from only the output of the reel winding radius calculator 16, and none of the heads 2 and 2' is extended. In the section (h), the target position is searched for at the velocity which is, for example, 4 times as high as the ordinary playback velocity (the search velocity is not higher than the velocity at which the tape traveling can be stopped immediately by braking).

Owing to the above contrivances, the time period for which the rotary heads 2 and 2' are held in contact with the magnetic tape 3 can be reduced to the required minimum. Accordingly, this embodiment is greatly effective in that the service life of each rotary head can be prolonged, and each head can be prevented from getting out of order due to powder which is ascribable to the frictional wear of the tape 3.

By the way, when the temporal information serving as the positional information is not recorded on the magnetic tape 3 beforehand, it is recorded with the signal source 15, etc. by the recording heads 2 and 2' in the case of recording data.

Now, another embodiment of the present invention will be described with reference to FIG. 7.

Figure 7:
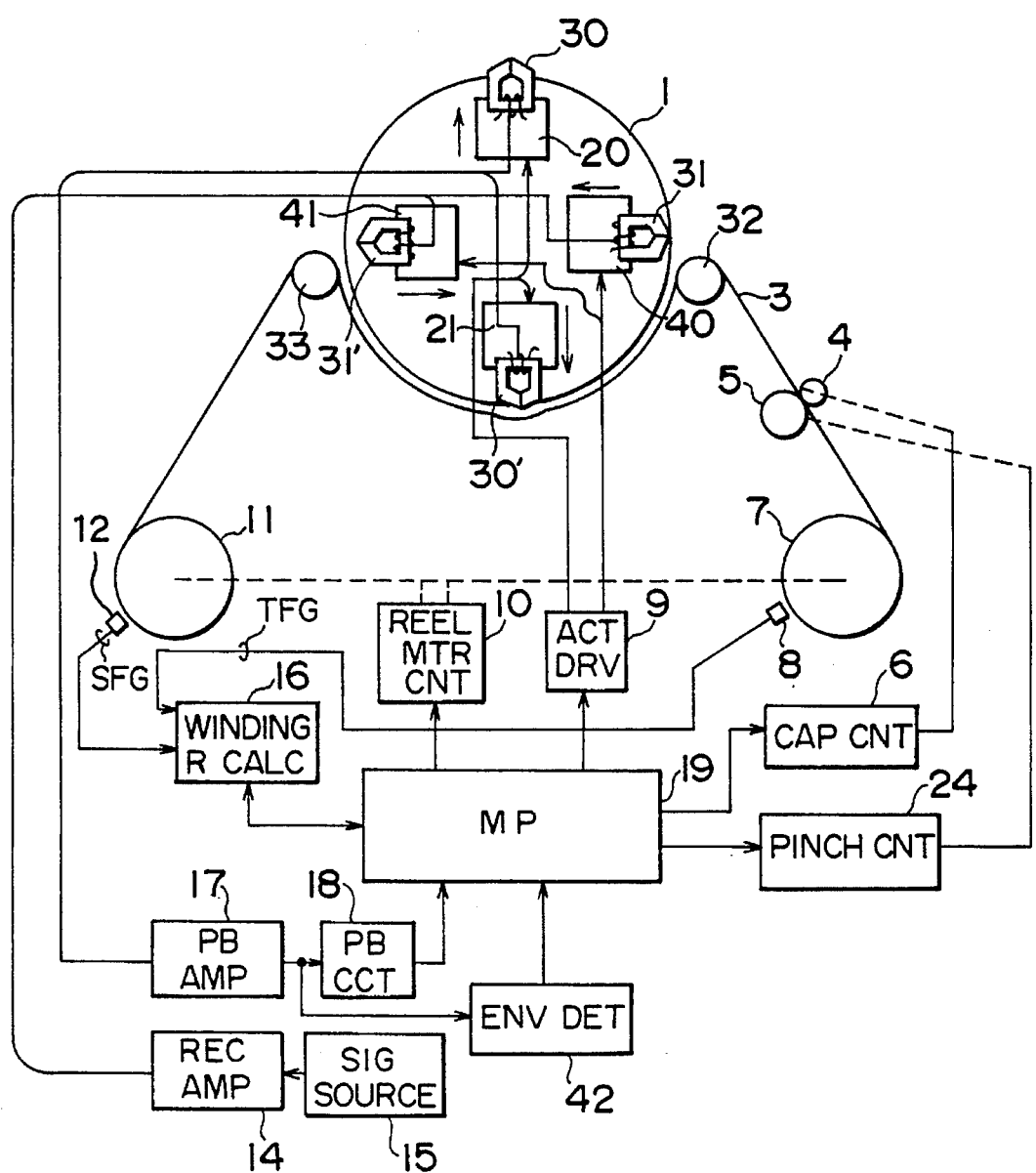
FIG. 7 is a block diagram showing still another embodiment of the recording/playback apparatus according to the present invention.

In FIG. 7, functional blocks which are respectively similar to those shown in FIG. 1 are indicated by the same symbols and operate similarly.

The embodiment illustrated in FIG. 7 includes heads 30 and 30' dedicated to playback (playback-only heads), actuators 20 and 21 for extending the respective playback-only heads 30 and 30', heads 31 and 31' dedicated to recording (recording-only heads), actuators 40 and 41 for extending the respective recording-only heads 31 and 31', and an envelope detector 42 functioning as level detection means. The embodiment in FIG. 7 is so constructed that the rotary heads 2 and 2' of the first embodiment in FIG. 1 are respectively made independently as the recording-only heads 31, 31' and the playback-only heads 30, 30'. Most of the conventional recording/playback apparatuses of the helical scanning type have this construction. The special merit of this construction is the function that a track recorded by the recording head can be subsequently played back by the playback head (hereinafter, the function shall be called "simultaneous monitoring"). The function is very useful for enhancing the reliability of the recording operation.

Although the construction can simultaneously monitor the recording in this manner, a rotary cylinder having a larger number of rotary heads has the drawback that all the rotary heads hit the surface of a magnetic tape throughout the recording or playback mode of the apparatus. The drawback causes such disadvantageous effects as making jitter more likely to arise, that the rotary heads wear away excessively, and that the rotary heads are more liable to get out of order on account of the powder of the magnetic tape attributed to the wear thereof.

This embodiment depicted in FIG. 7 is so contrived that the piezoelectric transducers 20, 21, 40 and 41 are respectively mounted on the playback-only heads 30 and 30' and the recording-only heads 31 and 31'. Thus, the individual sets of rotary heads (30 and 30' and 31 and 31') can be extended or protruded outward of the rotary cylinder 1 independently of each other, and the rotary heads which do not pertain to the recording or playback operation mode of the recording/playback apparatus are held out of contact with the magnetic tape 3.

Figure 8:
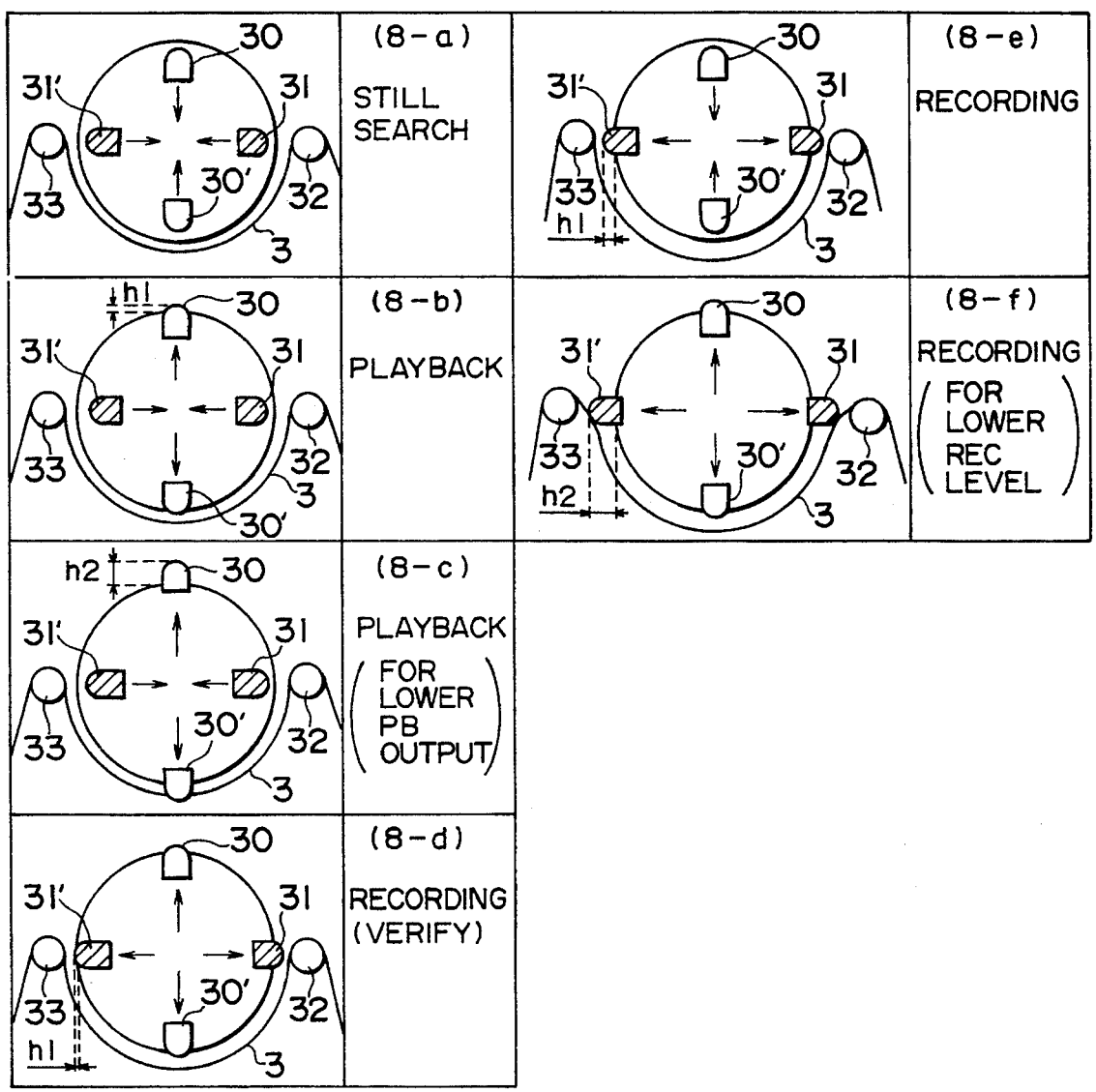
FIG. 8 is an explanatory diagram showing the extended and withdrawn states of rotary heads in the individual operating modes of the apparatus.

FIG. 8 is a diagram showing the states of the extensions of the recording-only heads 31, 31' and playback-only heads 30, 30' from the rotary cylinder 1, in the respective modes of still search, playback, playback (in the case where a playback output has lowered), recording (verify), recording, and recording (in the case where a recording level has lowered).

Here, in the recording mode, the actuator drive circuit 9 operates so that only the recording-only heads 31 and 31' may be extended from the rotary cylinder 1, and that the playback-only heads 30 and 30' may be withdrawn or accommodated inside the rotary cylinder 1. This state is shown at (8-e) in FIG. 8. Besides, in the playback mode, the actuator drive circuit 9 operates so that only the playback-only heads 30 and 30' may be extended from the rotary cylinder 1, and that the recording-only heads 31 and 31' may be withdrawn inside the rotary cylinder 1. This state is shown at (8-b) in FIG. 8.

Further, in the pause state of the apparatus and the rapid search mode thereof explained in the first embodiment of FIG. 1, none of the rotary heads need normally be held in contact with the magnetic tape 3. Therefore, the actuator drive circuit 9 operates so that both the sets of the playback-only heads 30 and 30' and the recording-only heads 31 and 31' may be withdrawn inside the rotary cylinder 1. This state is shown at (8-a) in FIG. 8.

Owing to the above contrivances, it is possible for only the rotary heads necessary for the individual modes to be held in contact with the magnetic tape 3 for the required minimum time periods. Thus, according to this embodiment, the service life of each rotary head can be prolonged, and each head can be prevented from becoming inoperable due to the powder which is ascribable to the frictional wear of the tape 3. Further, jitter can be reduced. Incidentally, the mode (8-c) will be explained later.

Next, means for supervising the contact or noncontact between the playback-only heads 30, 30' and the magnetic tape 3 will be explained with reference to FIGS. 7 and 8.

A feature of this embodiment is that the state of contact between the magnetic tape 3 and each of the playback-only heads 30, 30' is supervised in terms of the envelope detection level of a played-back signal, whereupon a control for increasing the extension magnitude of each of the playback-only heads 30, 30' is performed when a satisfactory detection level is not attained. Also, in order to prevent each of the playback-only heads 30, 30' from coming into excessively intense contact with the magnetic tape 3, a control for decreasing the extension magnitude is performed when the supervised envelope detection level lies in a saturation region.

More specifically, the envelope detection level is obtained in such a way that the played-back signal from each of the playback-only rotary heads 30, 30' is sufficiently amplified by the playback amplifier 17, and a detection output is produced from the amplified signal by the envelope detection circuit 42 and is input to the microprocessor 19. Even when the detection output is satisfactory, the excessive extension of the playback-only rotary heads 30, 30' from the rotary cylinder 1 might hasten the wear of the heads 30, 30' and might damage the tape 3. Therefore, the control of the extension magnitude of each of the playback-only rotary heads 30, 30' is performed by setting the optimum value to be that magnitude of the head extension which corresponds to the beginning of the saturation of the envelope detection level at a 10 predetermined value. The optimum value of the head extension magnitude is used for controlling the contact state between the tape 3 and each of the playback-only heads 30, 30'. The extension magnitude (h1) of each rotary head during the ordinary playback is indicated at (8-b) in FIG. 8, while the extension magnitude (h2 where h2>h1 holds) of each rotary head in the case where the playback output has lowered is indicated at (8-c).

In this way, the extension magnitude of each of the playback-only rotary heads 30, 30' can be controlled so as to become a smallest possible value which produces the satisfactory played-back signal.

Next, an example of a recording/playback apparatus which is additionally provided with means for supervising the contact or noncontact between the recording-only heads 31, 31' and the magnetic tape 3 will be explained by referring to FIGS. 7 and 8 again.

In this embodiment, the rotary heads are mounted independently for recording and for playback. It is therefore possible to achieve the function (simultaneous monitoring) in which tracks recorded by the recording-only heads 31, 31' are immediately played back by the playback-only heads 30, 30'. This function makes it possible to check a recorded state substantially at the same time as the recording and is very useful for enhancing the reliability of the recording.

More specifically, the contact states between the recording-only heads 31, 31' and the magnetic tape 3 are not always optimum. When the contact states are improper, the recording might become imperfect.

In this regard, the embodiment illustrated in FIGS. 7 and 8 is so contrived that the contact states between the magnetic tape 3 and the recording-only heads 31, 31' are supervised on the basis of playback outputs delivered from the playback-only heads 30, 30' in the recording mode, whereupon a control for increasing the extension magnitude of each of the recording-only heads 31, 31' is performed when a satisfactory playback level is not attained.

This embodiment operates as stated below.

The actuator drive circuit 9 is controlled so that the extension magnitude of each of the playback-only heads 30, 30' in the simultaneous monitoring operation may become a predetermined value.

A video signal, for example, is output from the signal source 15 as a signal to-be-recorded, and it is subjected to a recording signal process (not shown). Thereafter, the processed signal is sent to the recording-only heads 31, 31' through the recording amplifier 14 so as to be recorded on the magnetic tape 3. The video signal recorded on the magnetic tape 3 is immediately played back by the playback-only heads 30, 30' which succeed the recording-only heads 31, 31'. After being sufficiently amplified by the playback amplifier 17, the played-back signal is sent to the microprocessor 19 through the envelope detector 42.

When the envelope detection level is insufficient, the microprocessor 19 judges the contact states between the recording-only heads 31, 31' and the magnetic tape 3 as being improper, and it delivers a control signal to the actuator drive circuit 9 so as to increase the extension magnitude of each of the recording-only heads 31, 31'. The extension magnitude (h1) of each recording head during the simultaneous monitoring is indicated at (8-d) in FIG. 8, while the extension magnitude (h2 where h2>h1 holds) of each recording head in the case where the playback output in the simultaneous monitoring has lowered is indicated at (8-f).

As thus far explained, according to the present invention, the extension magnitude of each of the recording-only heads 31 and 31' can be controlled by the simultaneous monitoring, so that the contact states between the magnetic tape 3 and the recording heads 31 and 31' can be rendered more reliable.

Now, still another embodiment will be described with reference to FIG. 6. The same functional blocks as in FIG. 1 are respectively denoted by the same numerals, and they shall be omitted from the description here.

Figure 6:
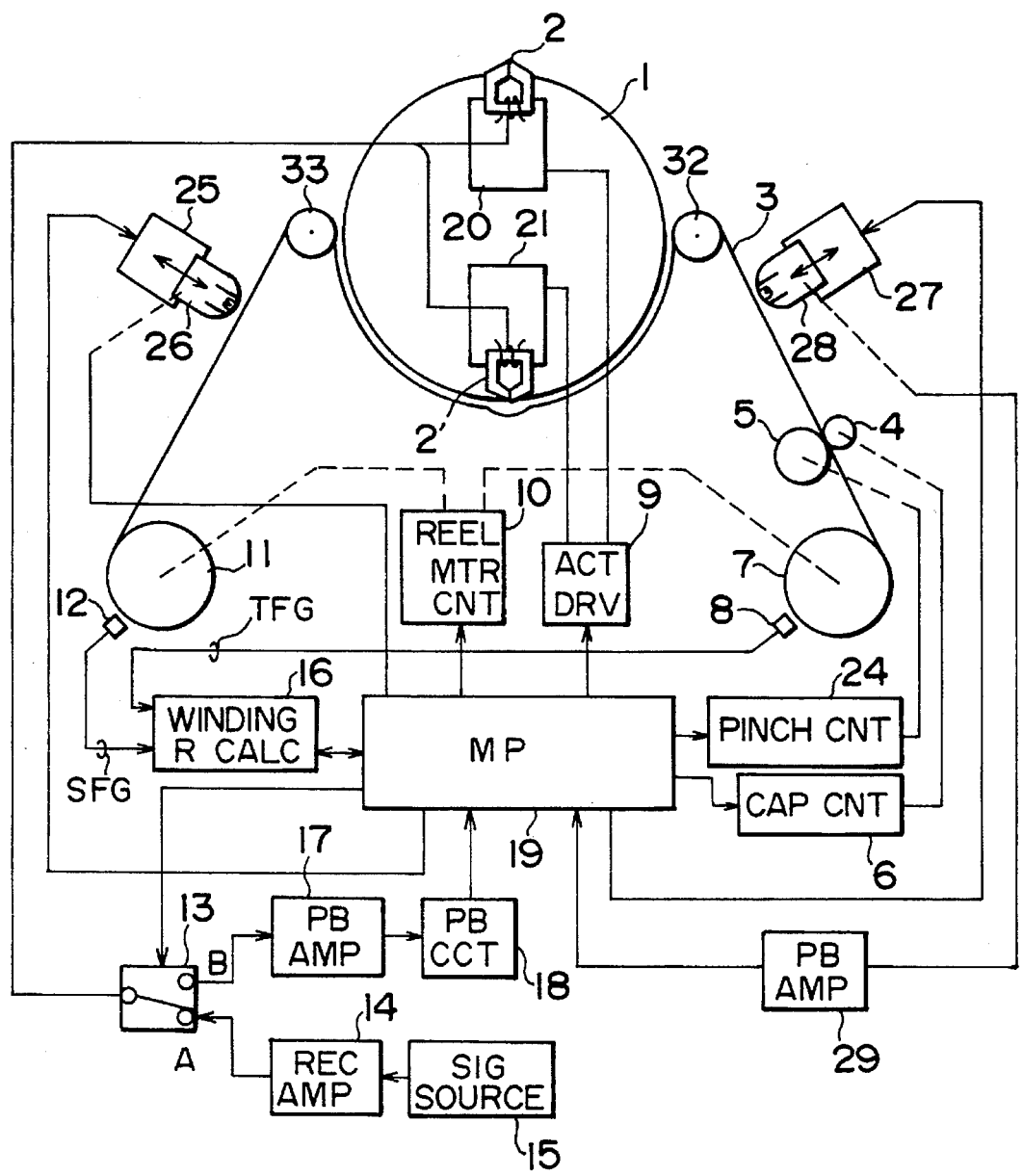
FIG. 6 is a block diagram showing another embodiment of the recording/playback apparatus according to the present invention.

Referring to FIG. 6, this embodiment includes fixed-head actuators 25 and 27, a fixed erasing head 26, a linear fixed head 28 for recording control signals, time codes, etc. in the longitudinal direction of the magnetic tape 3, and a playback linear track amplifier 29.

The first embodiment in FIG. 1 has referred to the system in which neither control signals nor time code signals are recorded in the longitudinal direction of the tape 3 by a linear fixed head. In this embodiment, there will be exemplified the application of the present invention to a recording/playback apparatus in which, besides the operation-of the first embodiment, the control signals, the time code signals etc. are recorded and erased in the longitudinal direction of the tape 3 by the linear fixed head 28 and the fixed erasing head 26, respectively.

The feature of this embodiment consists in the provision of a function for controlling the contact and noncontact states between the magnetic tape 3 and the linear fixed head 28 as well as the fixed erasing head 26.

Figure 3A:
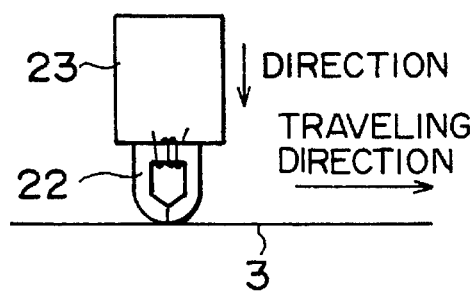
Figure 3B:
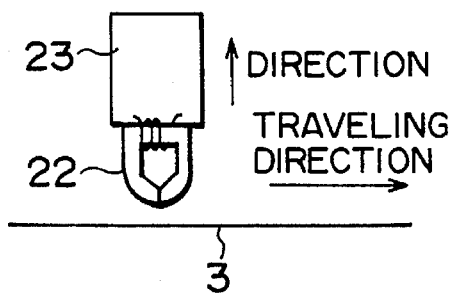
FIG. 3(b) is an explanatory view showing the state in which the fixed head is out of contact with the magnetic tape.

FIGS. 3(a) and 3(b) are views showing the contact state and the noncontact state between the magnetic tape 3 and the linear fixed head 28 or the fixed erasing head 26 (the fixed head 28 or 26 shall be represented by numeral 22), respectively. In the contact state of FIG. 3(a), the actuator 25 or 27 (represented by numeral 23) operates so as to extend toward the surface of the magnetic tape 3. In contrast, in the noncontact state of FIG. 3(b), the actuator 23 operates so as to retract away from the surface of the magnetic tape 3.

The operation of the recording/playback apparatus will be described below by taking rapid search as an example. Here, let's consider a series of operations in the case where the user of the apparatus wants to record information at a certain specified position on the magnetic tape 3.

In a case where the current mode of the apparatus is any other than the playback or recording state (it is pause, stop or the like), neither the fixed erasing head 26 nor the linear fixed head 28 needs to be held in contact with the magnetic tape 3, and hence, each of the heads 26 and 28 lies in the separated or spaced state shown in FIG. 3(b). Thus, the adhesion of the magnetic tape 3 to the fixed erasing head 26 or the linear fixed head 28 at the start of the traveling of the tape 3 as has hitherto been problematic can be prevented to ensure the safe traveling of the tape on such an occasion.

When a command for recording is input to the microprocessor 19 by the user, the microprocessor 19 tries to ascertain the current position of the tape 3. In a case where the current position is not known because of, e. g., the initial state of the recording/playback apparatus, the microprocessor 19 controls the pertinent portions of the apparatus so as to shift them into the playback state. When the playback mode has been established, the common contact of the switching circuit 13 is thrown to the side of the terminal B, and the pinch roller driver 24 brings the pinch roller 5 into tight engagement with the capstan 4.

When the tape has begun to travel, the linear fixed head 28 falls into the tape contact state shown in FIG. 3(a), and it plays back the control signal and the time code signal which are recorded in the longitudinal direction of the tape 3. These signals are input to the microprocessor 19 after being sufficiently amplified by the playback linear track amplifier 29. The control signal is used for generating a capstan control signal, while the time code signal is used for ascertaining the current tape position. As soon as the time code indicative of the specified tape position has been played back, the linear fixed head 28 is brought out of contact with the magnetic tape 3.

The microprocessor 19 computes the distance between the tape position which is being currently played back and the tape position at which the playback or recording is to be done. In a case where the distance is long, the operation of the recording/playback apparatus is shifted to the rapid search mode so as to move the tape 3 at high speed. Further, since the capstan 4 cannot follow up the high revolving speed of the rapid search, the tight engagement of the pinch roller 5 with the capstan 4 is released.

During the fast traveling of the tape 3, the linear fixed head 28 is out of contact with the magnetic tape 3, and hence, the time codes borne on the tape 3 cannot be read. Therefore, the approximate tape traveling position is calculated in such a way that the residual quantity of the tape 3 is detected by the reel winding radius calculator 16 on the basis of the signal (SFG signal) delivered from the revolution detector 12 corresponding to the supply reel 11 and the signal (TFG signal) delivered from the revolution detector 8 corresponding to the takeup reel 7. However, the exact tape traveling position cannot be known from only the information generated by the reel winding radius calculator 16. Therefore, the linear fixed head 28 is brought into contact with the tape 3 in single-shot fashion every predetermined cycle, whereupon the time code borne on the tape 3 is read. The detected result of the residual tape quantity is corrected every read time code. Thus, the accuracy of the tape position computed from the tape winding radii is enhanced.

When the vicinity of the desired tape position has been reached in due course, the pinch roller 5 is brought into tight engagement with the capstan 4, and the linear fixed head 28 is brought into contact with the magnetic tape 3. These controls are performed by the microprocessor 19.

Herein, the tape traveling is shifted into the slow state, and the position for the recording or playback is computed at high accuracy on the basis of the time code signals delivered from the linear fixed head 28. The final result is that the precise track as desired can be recorded or played back.

The cycles for reading the time codes on the tape 3 in the one-shot fashion during the rapid search may be set at will. By way of example, the cycles are controlled so as to shorten as the target position on the tape 3 is approached. In this way, the target position is not overrun.

Owing to the above contrivances, the time period for which the linear fixed head 28 and the fixed erasing head 26 are held in contact with the magnetic tape 3 can be suppressed to the required minimum during the rapid search. Accordingly, this embodiment is very effective in lightening the load components of the tape traveling attributed to the wear and friction of the linear fixed head 28 as well as the fixed erasing head 26.

As stated above, the rotary heads are held in contact with the tape 3 only when required. Thus, each rotary head can be effectively used to prolong the service life thereof, and it can be prevented from becoming inoperable due to powder which is ascribable to the frictional wear of the tape 3. Further, jitter can be reduced. Overall, the economy and reliability of the apparatus can be remarkably enhanced.

In any of the embodiments, the approximate position of the tape 3 is found by the reel winding radius calculator 16, and it is thereafter corrected with the temporal information. However, the present invention is not restricted to such an aspect of performance, but it may well find the position using only the temporal information. In this case, unlike each of the embodiments (in FIGS. 1, 6 and 7), the revolution detectors 8 and 12 and the reel winding radius calculator 16 are dispensed with, which further simplifies the apparatus, although the rotary heads must be brought into contact with the tape 3 more frequently.

As described above, according to the present invention, a recording/playback apparatus of high reliability and long service life can be provided while the requisite of rapid access is met.

What is claimed is:

1. A playback apparatus for playing back a magnetic signal indicative of positional information and previously recorded on a magnetic tape, said apparatus comprising:

tape traveling means for causing the magnetic tape to travel in a path;

playback head;

an actuator for supporting said playback head adjacent the tape travel path, said actuator responsive to a read command to bring said playback head into and out of contact with the magnetic tape as the magnetic tape travels on the tape travel path;

acceptance means for accepting target position information indicative of a target position on the magnetic tape;

a controller for applying a read command to said actuator to bring said playback head into and out of contact with the magnetic tape to cause said playback head to intermittently read the positional information magnetic signal from the magnetic tape;

generation means responsive to the read positional information magnetic signal for generating positional information indicative of the position of said playback head on the magnetic tape; and means responsive to the generated positional information for detecting whether the target position has been reached;

wherein said controller is responsive to said playback apparatus being in a search mode for applying the read command to said actuator so as to bring said playback head into contact with the magnetic tape a plurality of times at time intervals determined in accordance with the difference between the position of said playback head indicated by the generated positional information and the target position.

2. A playback apparatus as defined in claim 1, wherein said controller is responsive to said playback apparatus being in one of a pause mode and a stop mode for withholding the read command from said actuator so as to hold said playback head out of contact with the magnetic tape, and is responsive to said apparatus switching to a search mode for applying the read command to said actuator so as to bring said playback head into contact with said magnetic tape at least once before said magnetic tape is caused to travel to said target position, whereupon said playback head reads the positional information magnetic signal on the magnetic tape.

3. A playback apparatus as defined in claim 1, wherein said controller is responsive to the difference between the position of said playback head indicated by the generated positional information and the target position being smaller than a predetermined value for applying the read command to said actuator so as to hold said playback head in contact with the magnetic tape.

4. A playback apparatus as defined in claim 1, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

5. A playback apparatus for playing back a magnetic signal indicative of positional information and previously recorded on a magnetic tape, said apparatus comprising:

tape traveling means for causing the magnetic tape to travel in a path;

a playback head;

an actuator for supporting said playback head adjacent the tape travel path, said actuator responsive to a read command to bring said playback head into and out of contact with the magnetic tape as the magnetic tape travels on the tape travel path;

acceptance means for accepting target position information indicative of a target position on the magnetic tape;

a controller for applying a read command to said actuator to bring said playback head into and out of contact with the magnetic tape to cause said playback head to intermittently read the positional information magnetic signal from the magnetic tape;

generation means responsive to the read positional information magnetic signal for generating positional information indicative of the position of said playback head on the magnetic tape;

means responsive to the generated positional information for detecting whether the target position has been reached;

detection means for detecting the position of said playback head on the magnetic tape;

correction means for correcting the detected position of said playback head in accordance with the generated positional information;

comparison means for comparing the corrected position and the target position and determining the difference therebetween; and position determination means for determining the position of said playback head in accordance with the corrected position when the determined difference is greater than a predetermined value, and in accordance with the generated positional information when the determined difference is smaller than the predetermined value;

said responsive means detecting whether the target position has been reached on the basis of the position determined by said position determination means.

6. A playback apparatus as defined in claim 5, wherein said controller is responsive to said playback apparatus being in one of a pause mode and a stop mode for withholding the read command from said actuator so as to hold said playback head out of contact with the magnetic tape, and is responsive to said playback apparatus switching to a search mode for applying the read command to said actuator so as to bring said playback head into contact with said magnetic tape at least once before said magnetic tape is caused to travel to said target position, whereupon said playback head reads the positional information magnetic signal on the magnetic tape.

7. A playback apparatus as defined in claim 5, wherein said controller is responsive to the determined difference being greater than the predetermined value while said playback apparatus is in a search mode for applying the read command to said actuator so as to bring said playback head into contact with the magnetic tape a plurality of time at time intervals determined in accordance with the difference between the position of said playback head indicated by the generated positional information and the target position.

8. A playback apparatus as defined in claim 7, wherein said tape traveling means is responsive to the positional information indicating the playback head position on the magnetic tape is beyond a preset distance from the target position for causing the magnetic tape to travel at a first speedy and to positional information indicating the playback head position on the magnetic tape is within the preset distance from the target position for causing the magnetic tape to travel at a second speed less than the first speed.

9. A playback apparatus as defined in claim 5, wherein said controller is responsive to the difference between the position of said playback head indicated by the generated positional information and the target position being smaller than a second predetermined value for applying the read command to said actuator so as to hold said playback head in contact with the magnetic tape.

10. A playback apparatus as defined in claim 5, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

11. A recording/playback apparatus for recording a magnetic signal on a magnetic tape and playing back the recorded magnetic signal from the magnetic tape, said recording/playback apparatus comprising:

tape traveling means for causing the magnetic tape to travel in a path;

a playback head;

a first actuator for supporting said playback head adjacent the tape travel path, said first actuator responsive to a read-command to bring said playback head into and out of contact with the magnetic tape as the magnetic tape travels on the tape travel path;

a recording head;

a second actuator for supporting said recording head adjacent the tape travel path, said second actuator responsive to a second command to bring said recording head into and out of contact with the magnetic tape as the magnetic tape travels on the tape travel path;

positional information output means responsive to said recording/playback apparatus being in a recording mode for providing positional information, indicative of the position of the magnetic tape, to said recording head;

acceptance means for accepting target position information indicative of a target position on the magnetic tape in a playback mode of said recording/playback apparatus;

a controller for applying a read command to said first actuator to bring said playback head into and out of contact with the magnetic tape to cause said playback head to intermittently read a magnetic signal indicative of positional information previously recorded on the magnetic tape;

generation means responsive to the read positional information magnetic signal for generating positional information indicative of the position of said playback head on the magnetic tape; and means responsive to the generated positional information for detecting whether the target position has been reached;

wherein said playback head is positioned to follow said recording head as the magnetic tape travels on the tape travel path so that said playback head reads magnetic signals recorded on the magnetic tape by said recording head;

wherein said apparatus further comprises level detection means for detecting the level of the read magnetic signal; and wherein said controller applies a record command to said second actuator and is responsive to the detected level of the read magnetic signal to control the magnitude of a drive command so as to control the magnitude of the recorded signal.

12. A recording/playback apparatus as defined in claim 11, wherein said apparatus is adapted to operate in one of a plurality of operating modes, and said controller is responsive to the operating mode in which said apparatus is operating to apply a command to at least one of said first actuator and said second actuator for bringing at least one of said recording head and said playback head into contact with the magnetic tape.

13. A playback apparatus as defined in claim 11, wherein said controller is responsive to said playback apparatus being in one of a pause mode and a stop mode for withholding the read signal from said first actuator so as to hold said playback head out of contact with the magnetic tape, and is responsive to said apparatus switching to a search mode for applying the read signal to said first actuator so as to bring said playback head into temporary contact with said magnetic tape at least once before said magnetic tape is caused to travel to said target position, whereupon said playback head reads the positional information magnetic signal on the magnetic tape.

14. A playback apparatus as defined in claim 11, wherein said controller is responsive to said playback apparatus being in a search mode for applying the read command to said first actuator so as to bring said playback head into contact with the magnetic tape a plurality of time at time intervals determined in accordance with the difference between the position of said playback head indicated by the generated positional information and the target position.

15. A recording/playback apparatus as defined in claim 14, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

16. A playback apparatus as defined in claim 11, wherein said controller is responsive to the difference between the position of said playback head indicated by the generated positional information and the target position being smaller than a predetermined value for applying the read command to said first actuator so as to hold said playback head in contact with the magnetic tape.

17. A recording/playback apparatus as defined in claim 11, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

18. A recording/playback apparatus for recording a magnetic signal on a magnetic tape and playing back the recorded magnetic signal from the magnetic tape, said recording/playback apparatus comprising:

tape traveling means for causing the magnetic tape to travel in a path;

a playback head;

a first actuator for supporting said playback head adjacent the tape travel path, said first actuator responsive to a read command to bring said playback head into and out of contact with the magnetic tape as the magnetic tape travels on the tape travel path;

a recording head;

a second actuator for supporting said recording head adjacent the tape travel path, said second actuator responsive to a second command to bring said recording head into and out of contact with the magnetic tape as the magnetic tape travels on the tape travel path;

positional information output means responsive to said recording/playback apparatus being in a recording mode for providing positional information, indicative of the position of the magnetic tape, to said recording head;

acceptance means for accepting target position information indicative of a target position on the magnetic tape in a playback mode of said recording/playback apparatus;

a controller for applying a read command to said first actuator to bring said playback head into and out of contact with the magnetic tape to cause said playback head to intermittently read a magnetic signal indicative of positional information previously recorded on the magnetic tape;

generation means responsive to the read positional information magnetic signal for generating positional information indicative of the position of said playback head on the magnetic tape;

means responsive to the generated positional information for detecting whether the target position has been reached;

detection means for detecting the position of said playback head on the magnetic tape;

correction means for correcting the detected position of said playback head in accordance with the generated positional information;

comparison means for comparing the corrected position and the target position and determining the difference therebetween; and position determination means for determining the position of said playback head in accordance with the corrected position when the determined difference is greater than a predetermined value, and in accordance with the generated positional information when the determined difference is smaller than the predetermined value;

said responsive means detecting whether the target position has been reached on the basis of the position determined by said position determination means.

19. A recording/playback apparatus as defined in claim 18, wherein said apparatus is adapted to operate in one of a plurality of operating modes, and said controller is responsive to the operating mode in which said apparatus is operating to apply a command to at least one of said first actuator and said second actuator for bringing at least one of said recording head and said playback head into contact with the magnetic tape.

20. A recording/playback apparatus as defined in claim 19, wherein:

said playback head is positioned to follow said recording head as the magnetic tape travels on the tape travel path so that said playback head reads magnetic signals recorded for the magnetic tape by said recording head;

said apparatus further comprises level detection means for detecting the level of the read magnetic signal; and said controller applies a record command to said second actuator and is responsive to the detected level of the read magnetic signal to control the magnitude of said drive command so as to control the magnitude of the recorded signal.

21. A recording/playback apparatus as defined in claim 18, wherein:

said playback head is positioned to follow said recording head as the magnetic tape travels on the tape travel path so that said playback head reads magnetic signals recorded on the magnetic tape by said recording head;

said apparatus further comprises level detection means for detecting the level of the read magnetic signal; and said controller applies a record command to said second actuator and is responsive to the detected level of the read magnetic signal to control the magnitude of said drive command so as to control the magnitude of the recorded signal.

22. A playback apparatus as defined in claim 18, wherein said controller is responsive to said playback apparatus being in one of a pause mode and a stop mode for withholding the read signal from said first actuator so as to hold said playback head out of contact with the magnetic tape, and is responsive to said apparatus switching to a search mode for applying the read signal to said first actuator so as to bring said playback head into temporary contact with said magnetic tape at least once before said magnetic tape is caused to travel to said target position, whereupon said playback head reads the positional information magnetic signal on the magnetic tape.

23. A playback apparatus as defined in claim 18, wherein said controller is responsive to said playback apparatus being in a search mode for applying the read command to said first actuator so as to bring said playback head into contact with the magnetic tape a plurality of time at time intervals determined in accordance with the difference between the position of said playback head indicated by the generated positional information and the target position.

24. A recording/playback apparatus as defined in claim 23, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

25. A playback apparatus as defined in claim 18, wherein said controller is responsive to the difference between the position of said playback head indicated by the generated positional information and the target position being smaller than a predetermined value for applying the read command to said first actuator so as to hold said playback head in contact with the magnetic tape.

26. A recording/playback apparatus as defined in claim 18, wherein said tape traveling means is responsive to the positional information indicating the playback head position on the magnetic tape is beyond a preset distance from the target position for causing the magnetic tape to travel at a first speed, and to positional information indicating the playback head position on the magnetic tape is within the preset distance from the target position for causing the magnetic tape to travel at a second speed less than the first speed.

* * * * *